United States Patent [19]

Hofstede et al.

[11] E Re. 30,639

[45] Reissued Jun. 9, 1981

[54] PROCESS AND DEVICE FOR BENDING ELONGATED ARTICLES

[75] Inventors: Marinus J. Hofstede, Berkel; Leonardus J. C. Hermans; Jan W. de Koe, both of Dordrecht, all of Netherlands

[73] Assignee: Cojafex B.V., Netherlands

[21] Appl. No.: 117,779

[22] Filed: Feb. 1, 1980

Related U.S. Patent Documents

Reissue of:

[64] Patent No.: 4,151,732
Issued: May 1, 1979
Appl. No.: 829,403
Filed: Aug. 31, 1977

[30] Foreign Application Priority Data

Sep. 3, 1976 [NL] Netherlands ..... 7609864

[51] Int. Cl.[3] ..... B21D 7/16

[52] U.S. Cl. ..... 72/8; 72/16; 72/128; 72/369

[58] Field of Search ..... 72/8, 9, 11–13, 72/16, 28, 128, 149, 310, 318, 342, 364, 369

[56] References Cited

U.S. PATENT DOCUMENTS

| | | | |
|---|---|---|---|
| 2,461,323 | 2/1949 | Hille | 72/342 |
| 2,812,004 | 11/1957 | Huet | 72/128 |
| 3,229,489 | 1/1966 | Huet | 72/128 |
| 3,328,988 | 7/1967 | Schmidt | 72/128 |
| 3,368,377 | 2/1968 | Hirayama et al. | 72/128 |
| 3,724,258 | 4/1973 | Hofstede et al. | 72/342 |
| 3,896,649 | 7/1975 | Stuart | 72/128 |
| 3,899,908 | 8/1975 | Somov et al. | 72/369 X |
| 3,902,344 | 9/1975 | Stuart | 72/128 |
| 3,958,438 | 5/1976 | Somov et al. | 72/128 |
| 4,056,960 | 11/1977 | Kawanami | 72/128 |
| 4,061,005 | 12/1977 | Kawanami et al. | 72/128 X |
| 4,062,216 | 12/1977 | Hanamoto et al. | 72/128 |

FOREIGN PATENT DOCUMENTS

| | | | |
|---|---|---|---|
| 163561 | 4/1954 | Australia | 72/128 |

*Primary Examiner*—Ervin M. Combs
*Attorney, Agent, or Firm*—Karl W. Flocks

[57] ABSTRACT

A process and a machine for bending elongated articles wherein the article is led progressively past a heating device heating a small band of the article, the bending taking place in said band, wherein for controlling the thickness of a wall portion lying in the bend one measures the longitudinal speed of said still unbent wall portion before this reaches the heating device and likewise the speed after this wall portion has passed the heating device, and adjusts the distribution of the temperature in the heating zone of the band by changing the heating pattern in dependence on the relation between said two speeds.

9 Claims, 1 Drawing Figure

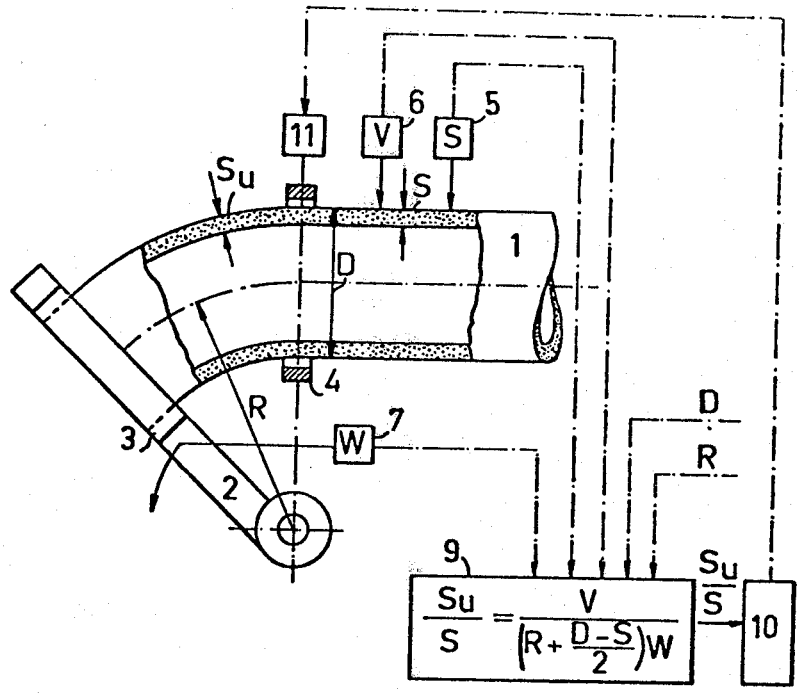
11
V
6
S
5
Su
S
1
D
4
R
3
W
7
2
D
R
9
Su/S = V / (R + (D-S)/2) W
Su/S
10

PROCESS AND DEVICE FOR BENDING ELONGATED ARTICLES

Matter enclosed in heavy brackets [ ] appears in the original patent but forms no part of this reissue specification; matter printed in italics indicates the additions made by reissue.

The invention relates to a process and device for bending elongated articles such as in particular pipes and aims at providing a process and device by means of which the material thickness change of the cross-section of the bend can be controlled.

Upon bending pipes to bends a thinning of the wall at the outer part of the bend and a thickening of the wall at the inner portion of the bend takes place as a rule. The degree of change of the wall thickness depends strongly on the bending radius and the way of bending.

In the bending method known for a long time past wherein the part to be bent of the pipe heated or not is bent around a jig, the thinning in the outer portion of the bend will be very great. In the newer bending methods such as described for instance in the Dutch patent specification No. 142.607 wherein the force which has to bring about the bending is exerted in the longitudinal direction of the pipe and wherein the bending takes place progressively in a narrow heated zone, the thinning at the outer part of the bend will be considerably smaller but nevertheless still more than desired and sometimes required technically or economically while the thickening of the inside of the bend is greater than in the bending method known for a long time past.

A thinning of the wall at the outside of the bend may be tolerated to a certain degree for reasons of strength and this even to an increasing degree at smaller R/D (bending radius/pipe diameter) ratios. A thickening of the wall of the inner side of the bend is even desirable for reasons of strength (according to the so-called Membrane tension theory, see likewise DIN 2413, page 6, under 4.8.). However, there are likewise instances which require that the wall of the band is minimally equal to the nominal wall of the pipe to be bent. Since the thinning of the outer bend wall is most important in the practice in particular with pipes the controlling of the thinning of the outer bend wall will mainly be described below.

If a bend has to be bent while one can expect that the thinning of the outer bend wall reduces 15% and one wishes to obtain a thinning which is not more than 5% of the nominal wall thickness, the starting pipe has to present a wall thickness which lies certainly 10% above the nominal thickness. Standard pipes are rolled mostly in practice with a wall thickness of 8 to 10% above the nominal value. If one bends according to the above mentioned newer method and one is "fortunate" in bending then it may occur that one remains within the allowed tolerance using these normal Standard pipes. However, if one wishes to be sure thereof then one will have to use pipes with extra thick walls for rolling. This signifies that in practice a wall having 25 to 30% above the nominal wall dimensions at least in the place where the outer bend wall will be situated must be used, using pipes with eccentric boring. It will be clear that such pipes are relatively heavier and dearer and demand a longer time of delivery.

Consequently, it is extremely desirable that one can use a bending method with which a bend can be produced starting with normal Standard pipes, the thinning of which remains within the extra wall thickness margin of 8 to 10%. This includes therefore the condition that the thinning has to lie within 8% with as a result a wall thickness at the outside of the bend equal or even greater than the normal wall thickness.

The present invention provides a method which renders it possible to control the wall thickness changes during the bending by determining and if necessary amending them.

The result of this method in brief is significant in controlling the thickness of the outer bend wall so that a state is created in the bending zone wherein the neutral line (this is the line where the axial pressure and tensile strengths pass into each other) will be situated as near as possible to the outer bend wall. If the neutral line is lying in the center of the outer bend wall then the outer wall will maintain its original dimension (thickness); if the neutral line is lying past the center of the outer bend wall for instance touching the outer bend or still further outwardly then even a thickening is produced.

The problem is therefore to control the bending process such that the neutral line is lying in the place where it is most desirable in order to control in this way the change in the wall thickness.

The process according to the invention which joins in particular to the above described newer bending method is characterized for solving the indicated problem in that for controlling the thickness of a wall portion lying in the bend one measures the longitudinal speed (displacement per time interval) of this still unbent wall portion before this reaches the heating device and likewise the speed (displacement per time interval) after this wall portion has passed the heating device, and adjusts the axial tensions in the heated zone in dependence on the relation between said two speeds such that the thickness of the bent wall portion meets the indicated conditions.

The process is not only applicable in bending pipes of the type discussed above but also of other elongated articles, for instance I-beams. Hereafter the application will be treated exclusively in regard to bending pipes where there will be question mainly of the thinning in the outer bend.

Consequently in the process according to the invention the speeds or displacement per time interval of the wall portion at the outer bend which this wall portion presents before and after the bending in the narrow heated zone will be compared with each other. This comparison produces a measure of the changes in the wall thickness presenting themselves in this wall portion while bending, it is not possible in practice to measure said changes in another direct way. The bending process is influenced with the help of this comparison if the wall change presenting itself deviates too much from the desired value by changing the distribution of the axial tensions in the bending zone. One could do so directly by increasing the total pressure charge in the bending zone, which, however, is much too unpractical. Such a method has been described in the U.S. Pat. No. 3,899,908 as well as in the Deutsche Offenlegungsschrift No. 2.304.838. A change in the temperature distribution in the heated zone whereby the outer bend is heated less than the inner bend in order to reduce the thinning in the outer bend is preferred. Such a change in the temperature distribution causes indirectly a change in the distribution of the axial tensions about the pipe. In both the cases the neutral line displaces itself to the outer bend for reducing the thinning in the outer bend. If one goes so far that the neutral line will be situated in the center of the wall portion at the outer bend this wall portion will not obtain a longitudinal change in the longitudinal direction and therefore a thinning in the radial direction.

It is simple to measure the speed or displacement per time interval of the wall portion which will be situated at the outer bend before the bending because this speed is equal to the speed with which the pipe is fed to the heating device. The direct measuring of the velocity of the concerned wall portions immediately after the bending which has presented itself in the heated zone is more difficult also owing to the elevated temperature in the vicinity of the bending zone. For instance an optical measuring method cannot be applied simply because a row of marking stripes has to be arranged previously on the pipe which run the risk to be damaged or even to disappear during the heating. If the pipe is bent according to an arc then one can derive the velocity of the concerned wall portion from the distance from this wall portion to the center of the circle and the rotation velocity of the radius connecting this centre to the wall portion in question. In applying a swinging arm to which the leading end of the pipe to be bent is secured the rotational speed of said radius can be identified with the rotational speed of the swinging arm. One can measure the distance from the rotational axis to the concerned wall portion if one wishes to obtain to a great exactness the distance from this rotational axis to the centre of said wall portion. This centre lies at a distance D-S/2 from the center of the pipe wherein D is the pipe diameter and S the wall thickness. If necessary the wall thickness may be measured at the cold pipe, for instance with an ultrasonoric measuring method. However, the introduction of the nominal wall thickness most often will be sufficient in practice.

In carrying out in this way the speed measuring at the outer wall portion of the formed bend one has to rely on the fact that the bending radius R of the bend remains constant during the bending process. One can maintain very exactly the bending radius in the method according to the Dutch Pat. No. 142.607 and moreover the ovality of the bent pipe may be neglected here. The place of the centre of the outer wall portion of the bend is thereby fixed exactly. Consequently the bending method according to said Dutch patent is extremely suitable to apply there the present invention.

A device with which a process according to the invention can be applied can contain a logical system to which the following values are fed: the feeding speed of the pipe, the speed of the the wall portion lying at the outer bend after the bending and possibly the thickness of this wall portion before the bending, said system producing a signal at pre-set values of pipe diameter and bending radius which is significant of the ratio of the wall thicknesses in the outer wall of the bend before and after the bending, and compares this ratio with the desired ratio and gives a signal in the case of deviation between the two ratios which may be used for a modification of the heating pattern of the heated zone. The invention will be elucidated further below by means of the drawing which gives an example in the diagram of the device wherein the invention is applied. The pipe to be bent is indicated by 1 in the FIGURE which is secured at 3 for instance by clamping to the swinging arm 2. The pipe is moved to the left side progressively in the direction of the bend by pressing, a small zone being heated by a heating ring encircling the pipe, for instance an inductor 4, the transformation and bending respectively taking place progressively in said zone. A measuring device 6 measures the longitudinal speed V with which the pipe is pressed, a measuring device 5 measures the wall thickness S of the still unbent pipe on the wall portion which will be situated at the outer side of the bend during the bending, and a measuring device 7 measures the rotational speed W of the swinging arm. Furthermore the bending radius R and the outer pipe diameter D have been indicated in the drawing as well as the wall thicknesses S and Su before and after the bending respectively. The measuring signals obtained from 5,6 and 7 are introduced in a logical system 9 wherein likewise the bending radius R and the outer pipe diameter D are introduced as constant values. The introduced signals are processed in the system 9 according to the formula $$\frac{Su}{S} = \frac{V}{(R + \frac{D - S}{2})\,W}$$

wherein Su represents the wall thickness at the outer wall of the bend after the bending. It is to be noted that one can apply a delay to the introduction of S in the system 9 when the place of measuring is lying relatively far from the place of bending and fluctuations may be expected of S along the length of the pipe at said introduction such that the measured value of S will become only effective when the measured place of the pipe has almost reached the place of bending. The output signal Su/S is compared in 10 with the desired value of Su/S and in the case of a difference between the two values a signal is sent to the adjusting device 11 for the heating ring 4 such that this is shifted in a direction perpendicular to the longitudinal axis of the unbent pipe until the desired ratio of Su/S is reached. This adjustment may be effected of course also by hand. There has been assumed in the above formula for the ratio Su/S in the right term that the center of the outerwall portion in the bend will be present at the same distance from the center of the pipe as the center of the still unbent wall portion.

Also other formulae can be applied instead of the above-mentioned formula if one starts from a plurality of measured quantities such as the velocity of the outside (outer wall) of the bent wall portion of the outer bend, or the distance from the outerside of the bent wall portion to the center of the bending radius. The introduction of such quantities can signify that the logical system 9 has to derive the ratio Su/S from a quadratic equation. All these measurements are based on the fact that the change in the wall thickness in the outer bend can be determined by measuring the prolongation in axial direction which the wall in the outer bend obtains during the bending. The result of this determination is then used to change if necessary the tension state in the heated zone preferably by modification of the heating pattern such that this wall portion obtains the desired thickness.

It is to be noted that it is known to heat a pipe to be bent unequally about the circumference and to apply a stronger heating at the innerside of the bend than at the outerside. However, it is not known how one can check continuously the wall thinning in the outer bend in order to control the wall thickness by means of this checking.

Finally it is to be noted that the application of the invention is not limited to the given example. To mention another example, it can also be applied in bending an I-beam when one wishes to maintain the thickness of one of the two flanges. It may occur then that one desires a determined flange thickening justly at the inner-side of the bend in connection with the force to which the bent beam will be subjected later on.

We claim:

1. A process for bending elongated articles such as pipes comprising the steps of leading the article progressively past a heating device heating a narrow annular band of said article in a heating pattern, in which band the bending is effected, controlling the thickness of a wall portion lying at the outside of the bend including the steps of measuring the longitudinal speed of said wall portion before it reaches the heating device, measuring the longitudinal speed of said wall portion after it passes the heating device, and adjusting the distribution of the temperature over the heated annular band by changing the heating pattern in dependance on the relation between said two speeds to produce a thickness of the said wall portion after bending which is reduced by not more than approximately 10% of its original value.

2. A process according to claim 1, wherein the article to be bent is a pipe and the heating device encircles annularly this pipe, further including displacing the heating device transversely to the longitudinal axis of the unbent pipe for adjusting the heating pattern until a desired relation of the said speeds is obtained.

3. A process according to claim 1, wherein the bending is brought about by having clamped the leading portion of the article in a swinging arm, the center of rotation of which is lying in or near a plane of the heated narrow annular band, further including deriving the speed of the wall portion lying in the bend which has passed the heating device from the rotation velocity of the swinging arm, and deriving the speed of the wall portion nearing the heating device from the velocity of feeding of the unbent article towards the heating device.

4. A process according to claim 3, wherein for obtaining the speed of the bent wall portion lying in the bend deriving said speed from the rotational speed of the swinging arm by taking as the radius of the arc the distance from the rotational axis of the swinging arm to the center of said wall portion.

5. A machine for bending pipes comprising means for moving the pipe longitudinally, heating means for heating the pipe to produce a heating effect in a narrow annular zone, a rotatable bending arm provided with means for clamping the pipe beyond the heating means, means for determining the velocity of the unbent pipe moving towards the heating means, means for determining the velocity of rotation of the bending arm, means for determining the relation between the two said velocities and means for bringing about a change in the heating effect of the heating means in dependence on the said relation.

6. A machine for bending pipes and the like comprising means for moving the pipe longitudinally towards and through a heating ring encircling the pipe and adapted to heat the pipe in a narrow annular zone, a rotatable bending arm provided with means for clamping the pipe beyond the heating ring, means for determining the velocity of the unbent pipe moving towards the heating ring, means for determining the velocity of rotation of the bending arm, means for determining the relation between the two said velocities, means for comparing the said relation with a pre-set relation, and means for shifting the heating ring in a direction perpendicular to the longitudinal axis of the unbent pipe in dependence on the comparison made.

7. A machine according to claim 6 comprising a data processing system to which are fed the velocity of the pipe moving towards the heating device and the velocity of rotation of the bending arm, which system, when provided with pre-set data of the pipe diameter and the bending radius, gives a signal which is significant of the relation between the thicknesses of the pipe wall portion concerned before and after bending.

8. A machine according to claim 6 comprising a data processing system, to which are fed the velocity of the pipe moving towards the heating device and the velocity of rotation of the bending arm, which system, when provided with pre-set data of the pipe diameter and the bending radius gives a signal which is significant of the relation between the thickness of the pipe wall portion concerned before and after bending, the relation being compared by the system with a pre-set desired relation, and when diverging therefrom an output signal is produced able to adjust the heating means.

9. Data-processing system for use in connection with a machine according to claim 7, by which the velocity of the pipe (V) the thickness (S) of the pipe wall portion which will constitute the outer bend portion, the bending radius (R), the pipe diameter (D) and the radial velocity (W) of the bending arm are processed to produce a signal according to the equation $$\frac{Su}{S} = \frac{V}{\left(R + \frac{D - S}{2}\right) W},$$

in which Su is the wall thickness at the outer wall of the bend.

* * * * *